United States Patent [19]

Wharton

[11] 4,207,850
[45] Jun. 17, 1980

[54] DEVICE FOR DETERRING UNAUTHORIZED OPERATION OF AN INTERNAL COMBUSTION ENGINE

[76] Inventor: Joseph E. Wharton, 32415 Yucaipa Blvd., Yucaipa, Calif. 92399

[21] Appl. No.: 910,767

[22] Filed: May 30, 1978

[51] Int. Cl.² ............................................ B60R 25/04
[52] U.S. Cl. ............................ 123/146.5 B; 180/287; 340/64; 307/10 AT
[58] Field of Search ............ 123/146.5 B, 198 B; 180/114; 307/10 AT; 340/63, 64

[56] References Cited

U.S. PATENT DOCUMENTS

| | | | |
|---|---|---|---|
| 3,614,460 | 10/1971 | Hale | 180/114 |
| 3,675,035 | 7/1972 | Brasty | 180/114 |
| 3,697,945 | 10/1972 | Comber | 180/114 |
| 3,720,284 | 3/1973 | Myers | 123/146.5 B |
| 3,850,260 | 11/1974 | Obermeit | 180/114 |
| 4,063,610 | 12/1977 | Shilling | 123/146.5 B |

Primary Examiner—Ira S. Lazarus
Attorney, Agent, or Firm—John H. Crowe; Fred N. Schwend

[57] ABSTRACT

An inexpensive anti-theft control device for an ignition fired internal combustion engine comprising a resistor and settable switch connected in series between the interruptor circuit from the ignition coil and ground whereby, when the switch is closed, a portion of the current normally necessary to induce sufficient voltage in the coil to properly fire the spark plugs is drained off.

6 Claims, 1 Drawing Figure

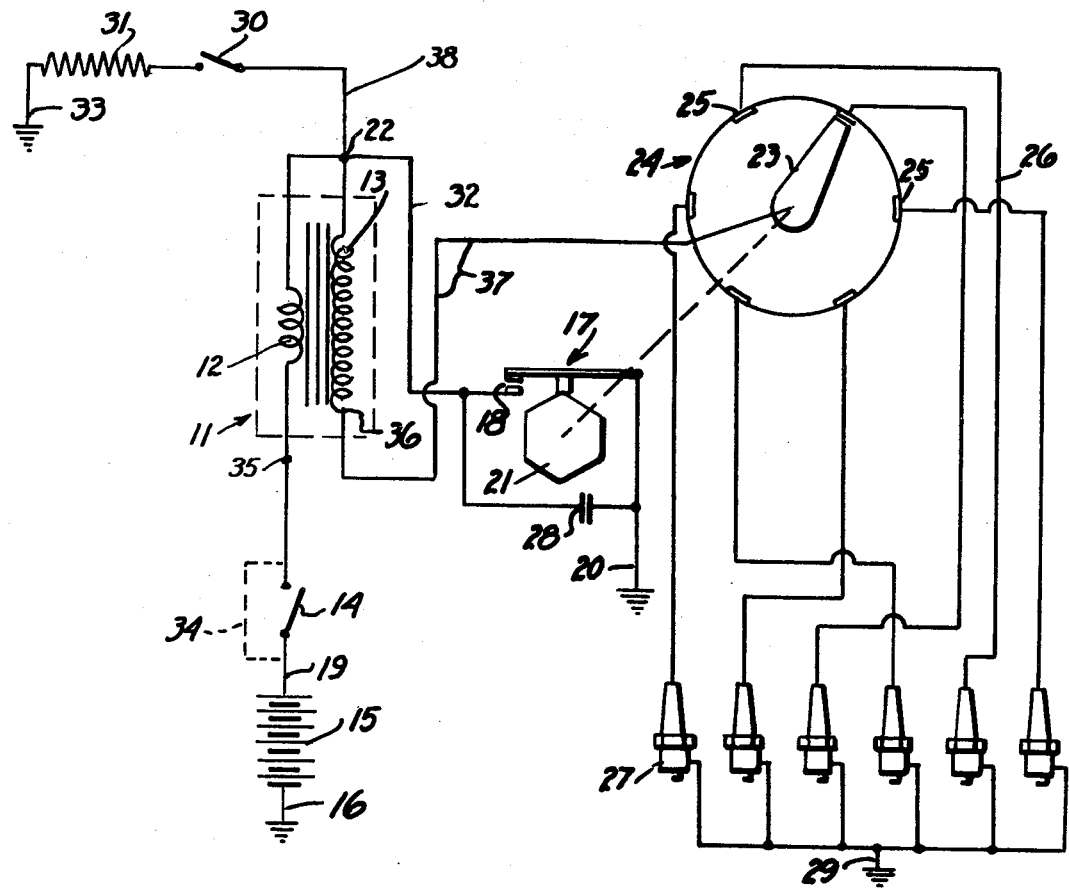

DEVICE FOR DETERRING UNAUTHORIZED OPERATION OF AN INTERNAL COMBUSTION ENGINE

BACKGROUND OF THE INVENTION

1. Field of the Invention

This invention relates to means for deterring operation of an internal combustion engine, such as used in a motor vehicle, and has particular reference to means for preventing operation of the ignition system and for rendering it difficult to detect such means.

2. Description of the Prior Art

Generally, the ignition system of a motor vehicle engine is controlled by a key lock operated switch to prevent theft or unauthorized operation of the vehicle. A proper key is thus generally required to release the lock and close the ignition switch in order to complete the ignition circuit. However, auto thieves and others can usually "hot wire" or short across the open contacts of the ignition switch and thus complete the circuit through the ignition system so as to start the engine.

Attempts to foil auto thieves from "hot wiring" an ignition system of a motor vehicle heretofore have usually comprised providing a hidden switch somewhere in the ignition circuit, in addition to the conventional ignition switch, so that even though the ignition switch is closed or shorted, the ignition circuit will not be completed. However, knowledgeable persons can readily detent the fact that the ignition circuit is incomplete and thus readily find and complete the circuit, as by using an additional conductor across the open portion of the circuit.

Other attempts have been made to render an ignition system inoperative by connecting a settable switch across the positive and negative terminals of the ignition coil. However, this procedure results in shorting out the coil and consequent overheating when the settable switch and the ignition switch are closed concurrently. Such overheating can readily cause damage to related components and even cause the motor vehicle itself to catch fire.

SUMMARY OF THE INVENTION

According to the present invention, the ignition circuit, including the usual key lock controlled ignition switch, is left intact so that closing such switch or "hot wiring" the same will complete the ignition circuit. However, an inexpensive added circuit is provided comprising a series connected resistor and settable switch, additional to the conventional ignition switch, such added circuit being connected between the negative terminal of the ignition coil and ground, in the case of a negative grounded battery. Thus, when the settable switch is closed, part of the current from the negative side of the ignition coil will be drained off through the resistor so that insufficient voltage will be developed by the ignition coil to properly fire the spark plugs.

The resistor and settable switch are easy to install in a relatively short time and may be placed in any location where they are hidden from view, either inside or outside the motor vehicle, in a location known only to the owner. Also, the wiring for such resistor and switch may be added to the usual wiring loom or harness to make it inconspicuous and difficult to distinguish from the conventional wiring for the vehicle. Since continuity of the ignition circuit is maintained when the ignition switch is closed or hot wired, there will be no normally detectable indication that the ignition system is incapable of sustaining ignition of the spark plugs unless special instruments are employed.

Since only a single line connection is required to connect the resistor and second switch in the ignition circuit and since it may be connected to ground anywhere on the vehicle and since the ignition circuit is completed when the ignition switch is closed, it would be extremely difficult and time consuming for a thief or other unauthorized person, even if he were knowledgeable of the basic principles of electricity, to determine that or how such device is connected.

Further, such settable switch and resistor may be left in circuit with the ignition system for any length of time without causing overheating of the ignition coil.

BRIEF DESCRIPTION OF THE DRAWING

The FIGURE in the drawing illustrates schematically a typical ignition system of an internal combustion engine embodying a preferred form of the present invention.

DESCRIPTION OF THE PREFERRED EMBODIMENT

While my invention is susceptible to embodiment in many different forms, there is shown in the drawing and will be described in detail one specific embodiment, with the understanding that the present disclosure is to be considered as an exemplification of the principles of the invention and is not intended to limit the invention to the embodiment illustrated.

Referring to the drawing, the ignition system for a typical internal combustion engine, such as is used in a motor vehicle, comprises an ignition coil, generally indicated at 11, including a low voltage primary winding 12 and a high voltage secondary winding 13.

The primary winding 12 is connected in a low voltage circuit which includes an ignition switch 14 and a battery 15, typically of 12 volts having its negative terminal connected at 16 to ground and its positive terminal connected at 19 to the ignition switch 14. A circuit interrupter generally indicated at 17 is connected by conductor 32 to the negative terminal 22 of the ignition coil 11, and comprises a pair of point contacts 18, one of which is movable and connected to ground at 20. The contacts 18 are intermittently opened and closed under control of a cam 21 suitably driven by the engine and having a number of equi-spaced lobes equal to the number of piston cylinders (not shown) comprising the engine.

The secondary winding 13 of coil 11 is connected to the primary winding 12 so that the coil functions as an auto transformer while the end 36 thereof is connected by high tension conductor 37 to the rotor 23 of a distributor cap 24. The latter has a number of equi-spaced terminals 25 equal in number to the number of engine cylinders. Lines 26 connect the terminals 25 to respective ones of a series of spark plugs 27 in a particular manner depending on the firing order of the cylinders. The ground sides of the spark plugs are connected at 29 to ground.

A capacitor 28 is connected across the contacts 18 to reduce arcing across such contacts when they are opened by the cam 21.

Rotor 23 is operatively connected to the cam 21 and is thus driven in time with the cam and with the engine to normally transmit high voltage current to the spark plugs at appropriate times.

When the ignition switch 14 is closed and the engine is turned over, current will be intermittently passed through the primary winding 12 and as the magnetic field induced by such winding intermittently collapses, it normally induces a relatively high voltage in the secondary winding 13 which is distributed by the distributor cap 24 to fire the spark plugs 27 in proper order.

Other typical internal combustion engine ignition systems (not shown) may employ solid state electronic switches, such as transistors, in lieu of the mechanically opened interrupter contacts 18 to intermittently interrupt the current through the primary winding 12.

According to the present invention, a settable switch 30, preferably having at least a three ampere capacity, and a resistor 31 having a resistance of from 8 to 10 ohms, inclusive, are connected in series with each other between the negative terminal 22 of the ignition coil 11 and ground at 33 by means of a conductor 38. The conductor 38 could obviously, if desired, be connected to conductor 32 at some point, rather than the negative terminal of ignition coil 11, although the latter arrangement is preferred for reasons of convenience and simplicity. Use of a resistor having less than 8 ohms resistance will tend to cause the same to burn out while use of a resistor having more than 10 ohms resistance will tend to make the resistor ineffective to drain off sufficient current to prevent operation of the spark plugs 27. The switch 30 and resistor 31 are preferably hidden in convenient locations, known only to the owner, on the motor vehicle.

When the switch 30 is set in open condition, the ignition system can be operated in the usual manner by closing the ignition switch 14 and operating the starting motor. However, in the event the owner wishes to prevent theft of his vehicle or unauthorized operation of the engine by persons who may be able to close the ignition switch 14 or who may be able to "hot wire" around such switch as by means of a conductor 34 (shown in dotted lines in the drawing), he need only close the switch 30. Accordingly, when an attempt is made to start the engine, part of the current passing through the secondary winding 13 will be drained off through the resistor 31 to ground and an insufficient voltage will be applied to the spark plugs to properly fire them. This will prove perplexing to an auto thief or other unauthorized person who, if the ignition system normally did not operate, would look for an opening in the high or low voltage circuits and would take the usual steps to close such opening. In this case, however, when the switch 30 is closed and the ignition switch is also closed some voltage will be applied to the spark plugs but it will be insufficient to properly fire them.

I have discovered that by using a wire wound resistor 31 of at least 5 watts and having from 8 to 10 ohms resistance, in connection with a typical 12 volt ignition system, some of the spark plugs 27 may fire once in a while in attempting unsuccessfully to start the engine, further giving the illusion that the ignition system is operating properly and that trouble in starting the engine is occuring elsewhere.

It will be noted that the point 33 of grounding of the resistor 31 may be made at any location on the metal vehicle frame or chassis. Also, the point of connection of the conductor 38 may be made at any location along the length of the conductor 32. Because of this freedom of location, the switch 30 and resistor 31 may each be hidden in any convenient place on the vehicle. Also, the conductor 38 may be run along with the usual loom or harness containing other conductors so that it will be difficult to detect or distinguish such conductor from the rest.

From the foregoing, it will be observed that numerous variations and modifications may be effected without departing from the true spirit and scope of the novel concept of the invention. For example, the battery 15 may be connected in the ignition circuit with its positive terminal connected to ground and its negative terminal connected to the ignition switch 14 without changing the function of the resistor 31, although, in that case, the switch 30-resistor 31 circuit will, of course, run from the positive terminal of the ignition coil to ground. It is, of course, intended to cover by the appended claims all such modifications as fall within the scope of the claims.

I claim:

1. In an ignition system for an internal combustion engine having spark plugs; a battery; an ignition switch; a circuit interrupter; an ignition coil having a low voltage primary winding, a high voltage secondary winding, a first terminal connected in series with said battery and said ignition switch, a second terminal connected in circuit with said interrupter, and a high tension terminal connected to said high voltage secondary winding; and a high voltage circuit for energizing said spark plugs in properly timed sequence from the high tension terminal of said ignition coil including a distributor rotor operable in time with said circuit interrupter:

means for preventing proper operation of said ignition system comprising the combination of:

resistance means for providing resistance to the flow of current in a circuit;

switch means alternately settable to open and closed positions; and current conducting means for interconnecting said resistance means and said switch means in series between said second terminal of said ignition coil and a suitable ground connection;

said resistance means having a resistance rating and current carrying capacity adequate to drain off current from said ignition coil, when installed for use in said ignition system, to prevent proper energization of said spark plugs, while permitting a limited energization of the plugs to give the impression that said ignition system is operating properly, and to avoid intrinsic overheating risks, during normal functioning thereof when said switch means is set to a closed position; and said switch means having sufficient current carrying capacity to insure proper functioning of said combination when it is set to a closed position in use;

whereby when said switch means in the installed combination is set to said closed position and said ignition switch is turned on, said ignition system appears to be functioning properly but said internal combustion engine will not start.

2. A combination in accordance with claim 1 wherein said resistance means comprises a resistor.

3. A combination in accordance with claim 2 wherein said resistor has a resistance of from about 8 to about 10 ohms, inclusive, and a wattage rating of at least approximately 5 watts.

4. A combination in accordance with claim 3 wherein said switch means is a push-on/push-off switch.

5. A combination in accordance with claim 4 wherein said push-on/push-off switch has a current carrying capacity of at least approximately 3 amps.

6. A combination in accordance with claim 5 wherein said resistor has a wattage rating of 5 watts and said switch has a current carrying capacity of 3 amps.

* * * * *